E. G. BREMER.
CANDY STARCHING DEVICE.
APPLICATION FILED APR. 30, 1915.
1,252,390.
Patented Jan. 8, 1918.
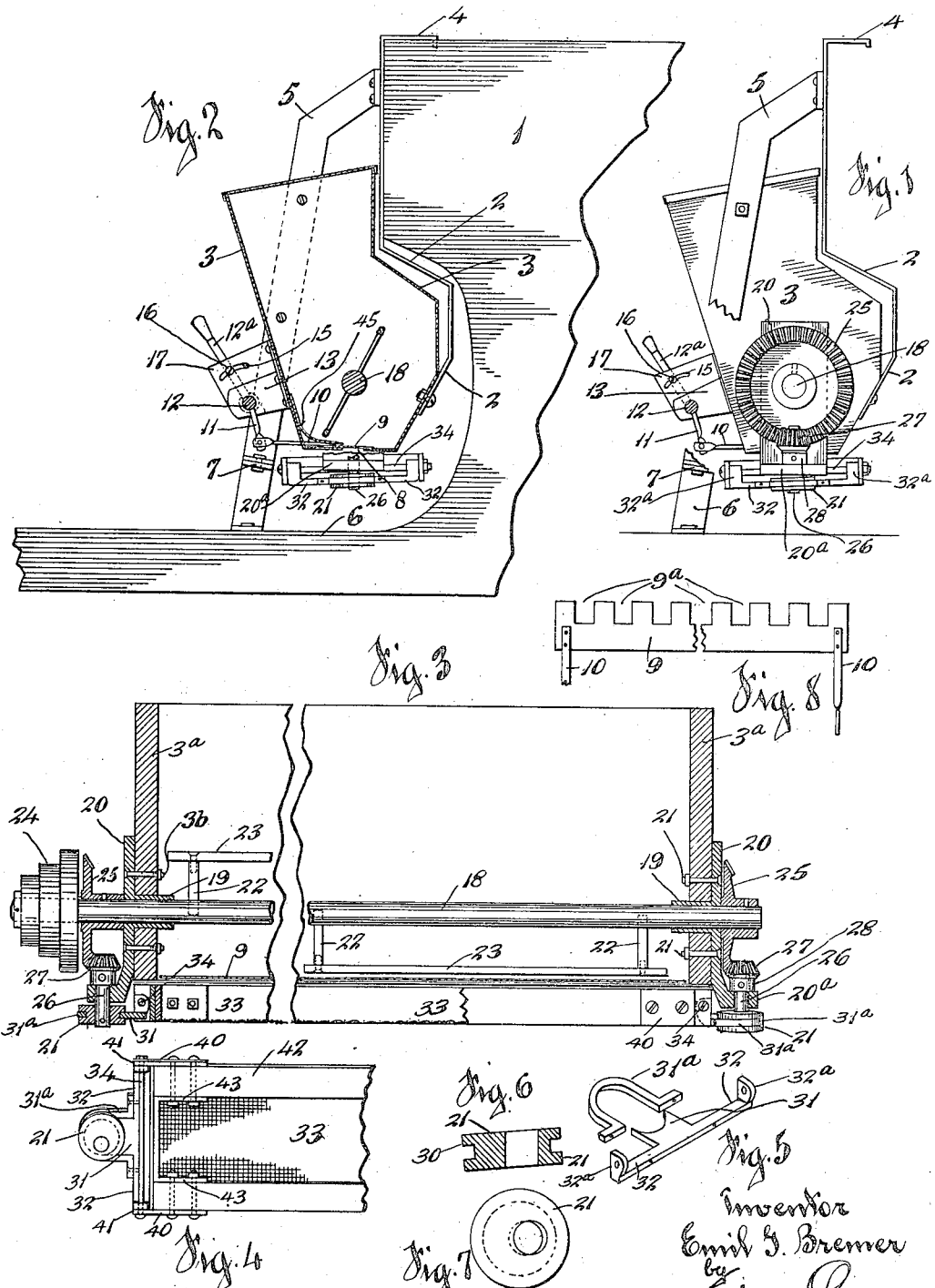

UNITED STATES PATENT OFFICE.

EMIL G. BREMER, OF CINCINNATI, OHIO.

CANDY-STARCHING DEVICE.

1,252,390.  Specification of Letters Patent.  Patented Jan. 8, 1918.

Application filed April 30, 1915. Serial No. 24,857.

*To all whom it may concern:*

Be it known that I, EMIL G. BREMER, a citizen of the United States, residing at Cincinnati, in the county of Hamilton and State of Ohio, have invented certain new and useful Improvements in Candy-Starching Devices, of which the following is a specification.

My invention relates to machines for starching candy and more particularly to devices for starching candy which can be mounted in a convenient position where it can operate to starch the candy just after the candy has passed from the candy depositor.

The object of the invention is to provide a starcher for candy which may be mounted adjacent and attached to a candy depositor, one which will efficiently sprinkle the starch uniformly over the candy, and one which is simple in construction and inexpensive to manufacture.

A further object of the invention is to produce a candy starcher with means for tilting the sifter and also for reciprocating the sifter vigorously for insuring the proper and uniform depositing and discharging of the starch.

My invention is intended for the starching of candy and is designed to operate more efficiently and advantageously than shown in my co-pending application, filed Apr. 14, 1914, Serial No. 831,842, patented May 2, 1916.

My invention consists of the certain parts and combination of parts as will be described in the following specification and pointed out in the appended claims.

In the drawings:

Figure 1 shows a side elevation of my improved candy starcher.

Fig. 2 is a cross section of same.

Fig. 3 is a central longitudinal section taken through my improved device.

Fig. 4 is a plan view of a portion of the sifting screen employed in my invention, showing the eccentric at one end for operating same.

Fig. 5 is a prospective view of the bracket mounted at the ends of the sifting screen.

Fig. 6 is a cross section of the eccentric employed in my invention showing the manner of boring same obliquely.

Fig. 7 is a plan view of same.

Fig. 8 is a detail view of the regulating gate employed in my invention.

Referring more particularly to the drawing, 1 represents a fragment of a candy machine, in this case a portion of a candy depositor, to which the machine is adapted to be attached, by means of the rear arms 2 fastened to the hopper 3 of the device and having the claws 4 at the top to fit over the edge of the depositor side arms 5 extend from the arms 3 down to the candy machine frame 6 and are provided with an adjustment 7 for properly supporting the machine on various style candy machines.

The starcher comprises the hopper 3 having its side made preferably of metal. A longitudinal opening 8 is provided at the bottom thereof through which the starch is adapted to be discharged. The opening 8 is adapted to be varied in width to regulate the amount of starch discharged from the hopper. This variation in width is accomplished by means of a sliding gate 9 having a series of notches $9^a$ cut in the edge thereof to regulate to a finer degree, the discharge of the starch. This causes the starch to pass through a series of small openings at the bottom of the hopper and prevents too much starch from being fed to the candy. The gate lies flat on the bottom of the hopper and arms 10 are fastened thereto which arms pass through the wall of the hopper, allowing the discharge opening to be regulated from the outside of the hopper by means of the arms 10. The arms 10 are fastened at their outer ends to arms 11 which are rigidly fastened to a connecting bar 12 extending along the front of the hopper. The connecting bar 12 is provided with a handle $12^a$ rigidly fastened to the connecting bar 12 near the middle thereof. The connecting bar is pivoted or journaled in brackets 13 mounted on the outside of the hopper 3. Adjacent to the operating handle $12^a$, I provide a bracket 17 having an arc shaped slot 15 therein through which a stud 16 passes, which stud is mounted in the handle $12^a$. A thumb screw 16 is mounted on the stud on the outside of the bracket 17 which serves to lock the handle in the desired position after the gate 9 has been adjusted to its proper position for allowing the desired discharge of the starch. A shield 45 is provided inside of the hopper over the gate 9 to prevent the starch from escaping through the holes in the wall thereof through which the arms 10 pass. Thus the opening 8 in the hopper may be regulated to allow the starch to be discharged in the proper quantities, consistent with the requirements of candies constructed of various ingredients.

A shaft 18 is mounted longitudinally in the hopper 3 near the bottom and above the opening 8 in the hopper and is suitably journaled in bushings 19 on the brackets 20 which bushings pass through the end walls 3ᵃ of the hopper. These brackets 20 are fastened on the outside of the end portions 3ᵃ of the hopper by bolts 3ᵇ.

Radially extending arms 22 are mounted on the shaft 18 inside of the hopper and have a bar 23 connecting them together at their outer ends, forming a dasher for the starch and when rotated keeps the starch agitated and in a loosened and powered condition.

The shaft 18 is rotated preferably by means of a pulley 24 on one end thereof. This pulley may be stepped down to various diameters to drive the shaft at different speeds. This may be necessary to take care of atmospheric conditions which sometimes effect the starch.

Mounted near each end of the shaft 18, I mount bevel gear wheels 25. The brackets 20 have horizontal extensions 20ᵃ thereon at the bottom, in which are mounted studs or vertical shafts 26. Pinion bevel gears 27 are mounted on these studs 26 and mesh with the gear wheels 25. A collar 28 is provided on each stud and holds same in proper position for the meshing of the gears.

An eccentric disk 21 (Fig. 6) is mounted on the lower end of the stud 26 and has flanges 30 making an annular channel to accommodate the bracket 31 which is carried thereby. This bracket has laterally extending arms 32 which are pivoted to the sides of the sifting screen 33 at the ends thereof by means of the studs 34.

The bracket 31 is provided with a cap 31ᵃ which is bolted to the bracket 31 after being fit into the annular channel of the eccentric 21. The extensions 32 on the bracket 31 have turned up portions 32ᵃ at the ends which are provided with apertures to allow the bolts 34 to pass therethrough. It will be understood that one of these brackets 31 is mounted at each end of the sifting screen 33, and also that the gear wheels 25, and pinion gears 27 are also mounted at each end of the device. The gear wheels 25 must be mounted on the shaft 18 in such a manner as to allow them when rotating to operate the pinion gears 27 in the same direction as shown in Fig. 3.

The sifting screen is provided with metal strips 40 at each end and at the sides which are fastened to the sides 42 of the sifting screen. The sides are held together at each end by means of an angular connecting brace 43 (Fig. 4). The metal strips 40 extend beyond the ends of the screen a short distance to provide ears 41 to which the bracket arms 32 are pivoted by means of the studs 34.

The eccentric is drilled obliquely as shown in Fig. 6 and therefore is mounted obliquely on the end of the stud 26. As the stud 26 is turned, the sifting screen is tilted with the rotation of said stud and thereby shakes the sifting screen and at the same time imparts a reciprocating curvilinear motion to the screen. The speed of the rotation of the shaft 18 therefore controls the vigor and speed with which the sifting screen is operated. The movement imparted to the sifting screen by reason of this mechanism is practically universal and about the same as that movement given same when the screen is shaken manually, although the operation is much more uniform.

It is believed that the operation of the device may be readily seen from the foregoing description, and that certain modifications of my invention may be made without departing from its spirit and scope; but I do not wish to be confined to the exact details shown.

What I claim as new and desire to secure by Letters Patent is:

1. In a machine for starching candy, the combination with a hopper, of an agitator in said hopper, a starch sifter under said hopper, said starch sifter suspended thereunder by means of eccentrically mounted rotatable disks, brackets mounted on the sides of said hopper and supporting said disks, and means for driving said agitator simultaneously with said disks and means for regulating the discharge of material from said hopper.

2. In a machine for starching candy, the combination with a hopper, of an agitator in said hopper, a starch sifter suspended under said hopper, brackets on the ends of said hopper supporting a vertical shaft, disks mounted on the bottom of said shaft, said shafts passing obliquely through said disks and eccentrically to the center thereof, said sifter being mounted on said disks and means for operating said agitator simultaneously with said shafts substantially as set forth.

EMIL G. BREMER.

Copies of this patent may be obtained for five cents each, by addressing the "Commissioner of Patents, Washington, D. C."